INVENTORS.
John A. Montgomery,
Louis E. Livingston,

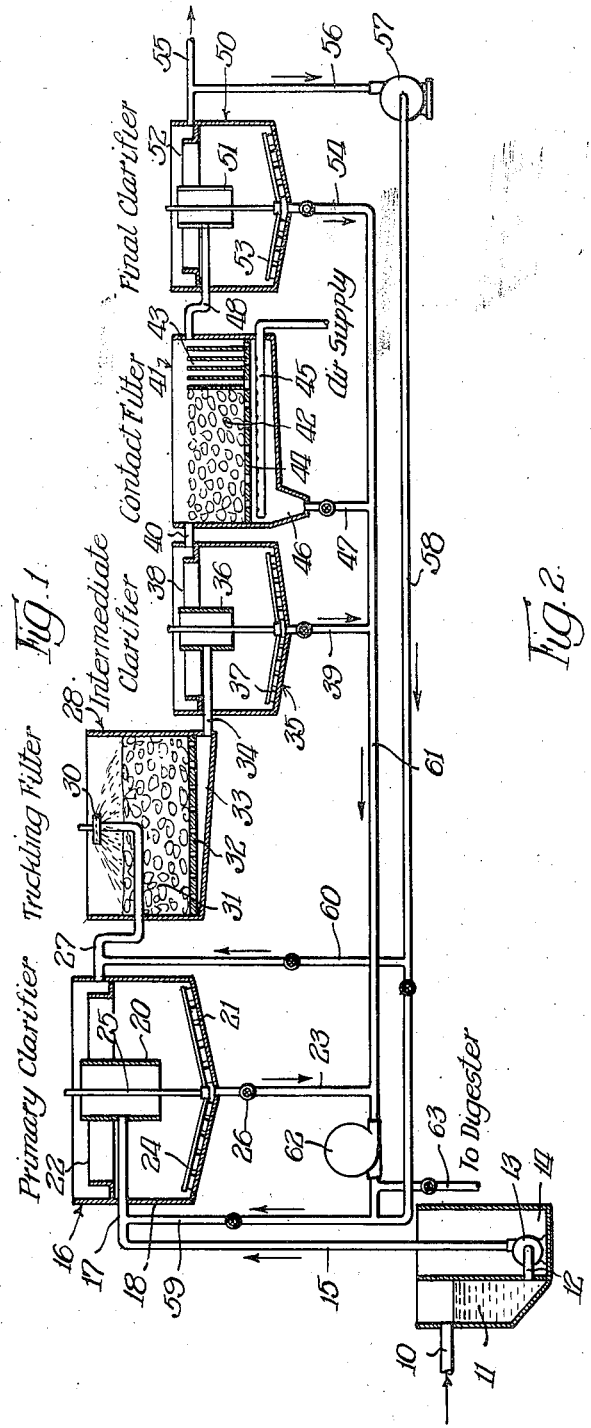

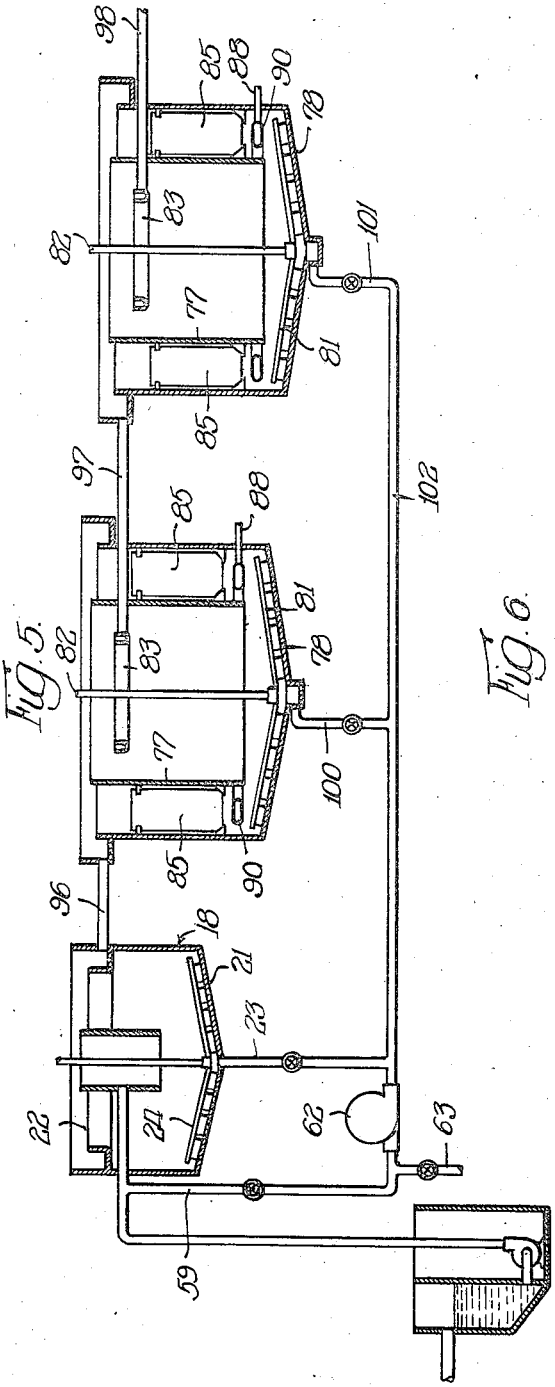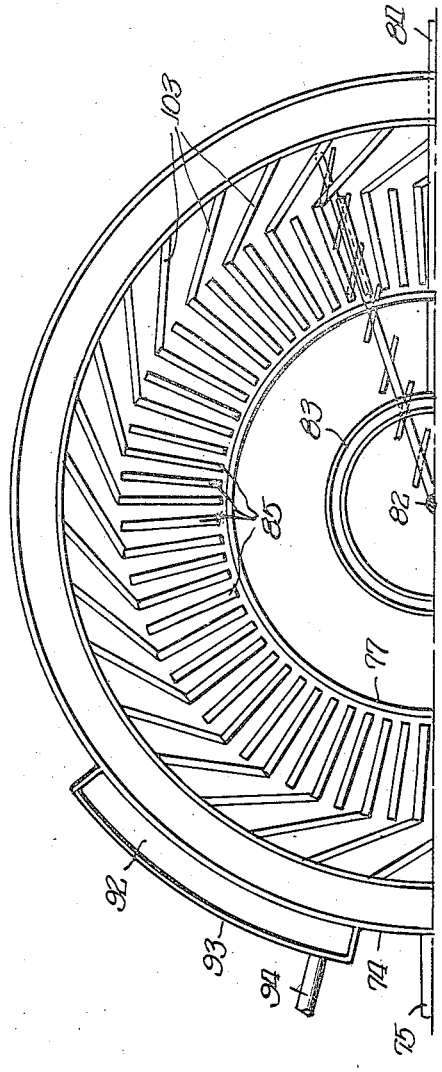

Patented Nov. 13, 1945

2,388,795

UNITED STATES PATENT OFFICE 2,388,795

SEWAGE DISPOSAL

John A. Montgomery, Denver, Colo., and Louis E. Livingston, Dallas, Tex., assignors to Lakeside Engineering Corporation, Chicago, Ill., a corporation of Illinois Application June 11, 1942, Serial No. 446,576

5 Claims. (Cl. 210—7)

The invention relates to sewage disposal and has reference more particularly to a method of treating sewage, trade wastes and the like by flowing the solution successively through filters of the trickling type, contact type, or both, with intermediate clarification and final clarification, and wherein the final clarifier may be combined with a contact filter in a single tank having improved construction and operation.

In the treatment of domestic sewage by trickling filters it is difficult to obtain a high degree of purification, that is, purification in excess of ninety per cent over-all reduction of the biological oxygen demand of the raw sewage, unless two or more filters are used in series and each filter followed by clarification. Moreover, even when two or more filters are used in series, separated by an intermediate clarifier, the final effluent is not as clear and sparkling as the effluent from an activated sludge process, but is more or less turbid and has a brownish cast.

The excess sludge or bacteria formed in a trickling filter is continuously withdrawn and is carried with the liquid to the intermediate clarifying tank. Additional purification can be obtained by delivering the solution from the intermediate clarifier to a contact filter in which the filter media is completely submerged and the solution is caused to contact biological organisms on the surface of the media in the presence of an abundance of oxygen supplied by air. Additional purification is also obtained in a contact filter through the flocculating action caused by the movement of the air upwardly through the liquid. The air is used to coagulate the colloidal material in the sewage and to oxidize the undissolved, unstaple organic compounds and some inorganic materials such as hydrogen sulphide into staple forms. Also the agitation with air aids in floating grease particles that may be present in the sewage.

In using the activated sludge process and also in the use of contact filters it is customary to bring the incoming sewage to the aerators at one end of the tank or on one side thereof and to flow the solution across the tank to the outlet. Such procedure often results in a short circuiting of the aeration chamber. Moreover, it does not provide a method for keeping the flocculated grease from passing through the entire plant. In addition, especially with contact filters, the bulk of the organic load entering the aeration chamber comes into contact with a relatively small portion of the media during the first few minutes of contact. A further difficulty in connection with contact filters is that the excess sludge deposits below the contact media and must be drawn off by gravity or by means of moving rakes or chains. The use of the latter entails expensive construction and difficulties in operation. If a mechanical means of raking or moving the sludge from the lower portion of the aeration tank is not employed the sludge must be collected in hoppers before it can be withdrawn from the tank. The latter results in an excess of sludge accumulation on the hopper walls and very soon septic action starts and the sludge rises to the surface of the tank.

The purpose of the present invention is to provide a method of treating sewage which will efficiently handle the effluent from a trickling filter of the high capacity type capable of loading in excess of 1600 lbs. biological oxygen demand (B. O. D.) per acre foot per day, or removing in excess of 1000 lbs. B. O. D. per acre foot per day.

Another object is to purify sewage and the like by subjecting the effluent from a high capacity trickling filter to the additional treatment provided by a contact filter with clarification of the liquid taking place between said filters.

Another object resides in a combination tank of improved construction and operation having an aeration chamber in contiguous and connecting relation with a settling chamber and which will provide for greater purification of sewage, and the like, by introducing the incoming solution around the periphery of the aeration chamber to more evenly distribute the organic load and to bring said organic load into contact with a greater portion of the air passing upwardly through the liquid.

A further object is to provide apparatus for treating sewage having an aeration chamber combined with a settling chamber and wherein the chambers are separated for the greater portion of their depth, having a connecting passage, however, below the air supply to the aeration chamber and which provides a weir of generally circular extent so that the flow of the liquid between chambers takes place at a minimum velocity.

Another object is to provide apparatus in which skimming, flocculating, oxidation by air, and settling are all accomplished in a common wall tank.

With these and various other objects in view, the invention may consist of certain novel features of construction and operation, as will be more fully described and particularly pointed out in the specification, drawings and claims appended hereto.

In the drawings which illustrate an embodiment of the invention and wherein like reference characters are used to designate like parts—

Figure 1 is a view illustrating sewage treating equipment including an arrangement of clarifiers and filters coming within the invention;

Figure 2 is a view likewise illustrating sewage treating equipment but including an alternative arrangement of clarifiers and filters coming within the invention and wherein the final clarifier is combined with the contact filter to provide a tank of improved construction and operation;

Figure 5 is a view illustrating the manner of using two combination tanks in series with a primary clarifier; and Figure 6 is a plan view showing a modified construction of the tank for increasing the filter material in the aeration chamber of the combination tank.

Figure 3:
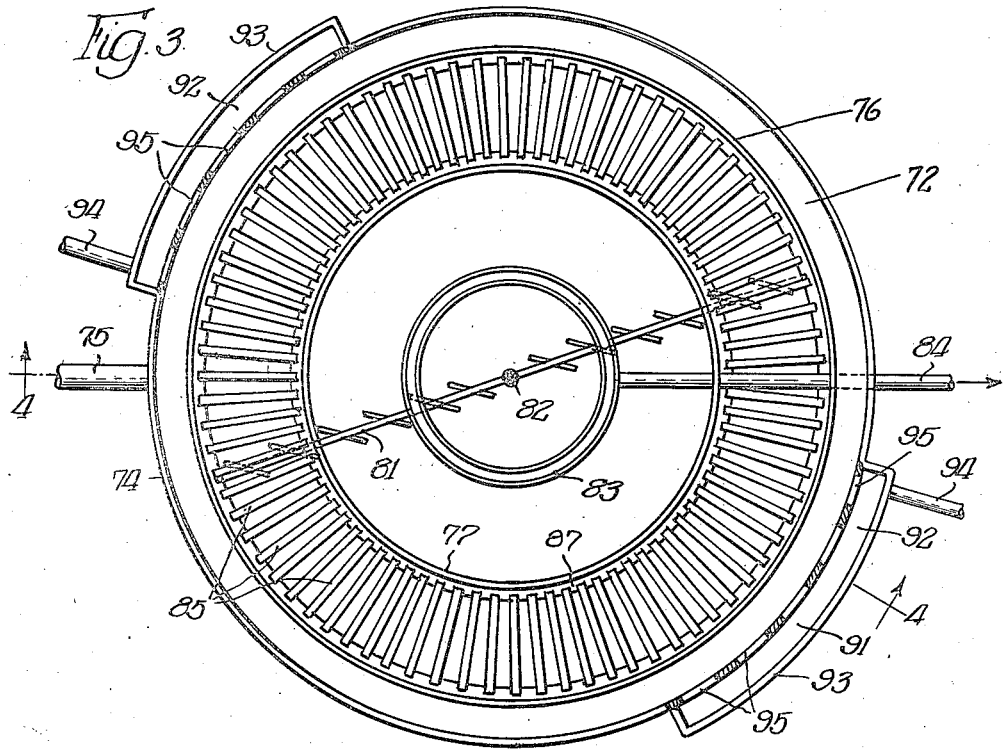
Figure 3 is a plan view of the combined filter and settling tank showing the improvements of the invention.

Referring to the drawings, particularly to Figure 1, the incoming sewage, trade wastes or the like to be clarified are initially delivered by pipe 10 to the well 11 having an outlet 12 at its base, which delivers the solution to a lift pump 13. The lift pump is located within the dry well 14 and said pump delivers to the vertical pipe 15 having connection with the primary clarifier indicated in its entirety by 16. The pipe 15 has a horizontal section 17 which passes through the vertical wall 18 of the primary clarifier and also the inner baffle wall 20 so that the solution from lift pump 13 is discharged within the baffle wall 20 located centrally of the primary clarifier and which is substantially concentric with the vertical wall 18 thereof. The baffle wall 20 is suitably supported in position and it will be understood that the solution entering the chamber formed thereby will be caused to flow downwardly toward the bottom 21 of the primary clarifier. The solution thereupon enters the settling chamber of the clarifier and in this chamber the flow of the solution is in an upward direction toward the overflow weir 22. The upflow of the solution tends to cause a large proportion of the solids to settle out and the sludge, which thereby accumulates on the sloping bottom 21 of the clarifier, is moved toward the central discharge pipe 23 by the scraper arms 24 suitably supported and rotated by the rod 25. The discharge pipe 23 is provided with a valve 26 so that the flow from this pipe can be controlled.

The solution from the settling chamber of the primary clarifier overflows the weir 22 and the same is conducted by pipe 27 to the trickling filter designated in its entirety by numeral 28. The spray 30 of this filter sprays the solution received from pipe 27 upon the filter media indicated by numeral 31 and suitably supported by the perforated plate 32 located some distance above the sloping bottom 33 of the trickling filter. The filter media may consist of crushed rock, gravel, slag, cinders, special tile or other materials of this type such as will provide a large surface area over which the solution discharged by spray 30 may flow. The biological organisms which will form on the surface of the filter media are supplied with the necessary oxygen directly from the air since in a trickling filter it will be understood that the media is not submerged. In accordance with the invention the trickling filter of Figure 1 is a high capacity filter capable of loading in excess of 1600 lbs. B. O. D. per acre foot per day and capable of removing in excess of 1000 lbs. of B. O. D. per acre foot per day.

The solution flowing through the filter media of the high capacity trickling filter passes through the perforated supporting plate 32 and is collected by the sloping bottom 33 to be delivered by pipe 34 to an intermediate clarifier indicated in its entirety by numeral 35. Said intermediate clarifier is substantially similar in construction and operation to the primary clarifier having an interior baffle wall 36, rotary scraper arms 37, and an overflow weir 38. The solution from the trickling filter is initially delivered to the downflow chamber provided by the circular baffle 36 and said solution upon reaching the settling chamber flows in an upward direction to the overflow weir 38.

From the intermediate clarifier the solution is then delivered by pipe 40 to a contact filter indicated in its entirety by numeral 41. The filter media may comprise crushed gravel 42 and the plates 43, the said media being supported by the perforated base plate 44 under which is located an air supply in the form of a perforated tube 45. The sloping bottom of the contact filter discharges into a sump 46 having an outlet for the sludge indicated by 47. The air under pressure issuing from the openings in the pipe 45 will flow upwardly around and between the stones and plates comprising the filter media, thus aerating the solution within the contact filter and which is maintained at a level so that the media is submerged. A biological slime coating forms on the surface of the filter media as a result of the oxygen supplied by the air. The biological organisms form an activated slime coating on each stone or plate within the contact filter and this coating nitrifies the organic substances in the sewage, reducing them to simple salts. Also the air is used to coagulate the colloidal material in the sewage and to oxidize the dissolved unstaple organic compounds and some inorganic compounds into staple forms.

From the contact filter 41 the pipe 48 conducts the solution to the final clarifier indicated in its entirety by numeral 50. The construction of this final clarifier is similar to the primary and intermediate clarifier. The interior baffle wall 51 provides a downflow chamber located centrally within an upflow or settling chamber having an overflow weir 52. The rotary sweeps 53 collect the sludge deposited on the sloping bottom of the clarifier and deliver the same to the sludge outlet 54. The clear effluent from this final clarifier overflowing the weir 52 is conducted from the clarifier by pipe 55. Pipe 55 is connected by 56 to recirculating pump 57 which may deliver the clear effluent through pipe 58 back to the primary clarifier or to the trickling filter by means of the connecting pipes 59 or 60, respectively. Control of the clear effluent being recirculated is possible as a result of the valves located in the said pipes 58, 59 and 60. It will also be observed that the sludge outlet for each clarifier and for the contact filter are joined by pipe 61, having connection with the sludge pump 62. The outlet for the sludge pump is joined to pipe 58 and said outlet also has connection with pipe 63 leading to the digester. Accordingly, the sludge from the said pump 62 may be delivered to the primary clarifier or to the digester, depending on the particular operation desired.

The sewage treating equipment of Figure 1 is characterized by a high capacity trickling filter combined with a contact filter, having an intermediate clarifying tank located between the filters, and with a final clarifying tank following the contact filter. The sludge or bacteria formed in the trickling filter is delivered to the intermediate clarifying tank. In this tank a large proportion of the settleable solids and excess sludge will settle out. The solution overflowing the weir 38 of the intermediate clarifier, however, requires still further purification, particularly purification designed to remove the colloidal material and light sludge remaining in the solution. The same is therefore delivered to a contact filter where additional purification is obtained by means of the contact of the solution with the biological organisms on the surface of the filter media maintained as a result of the upwardly flowing currents of air through the filter media. In the final clarifier the solution from the contact filter is given its final purification in which the settleable solids and sludge produced as a result of the aeration of the solution in the contact filter are caused to settle out.

The sewage treating equipment of Figure 2 is similar in all respects to that shown in Figure 1, with the exception that the contact filter and final clarifier have been combined in a common walled tank, designated in its entirety by numeral 64, having an aeration chamber provided with filter media and a settling chamber for performing the functions of the final clarifier before the effluent is discharged. In this form of the invention the spray 70 for the trickling filter is of the rotating type, said spray having a plurality of orifices directed in a manner so that the solution discharging therefrom under pressure will cause the spray to rotate.

Figure 4:
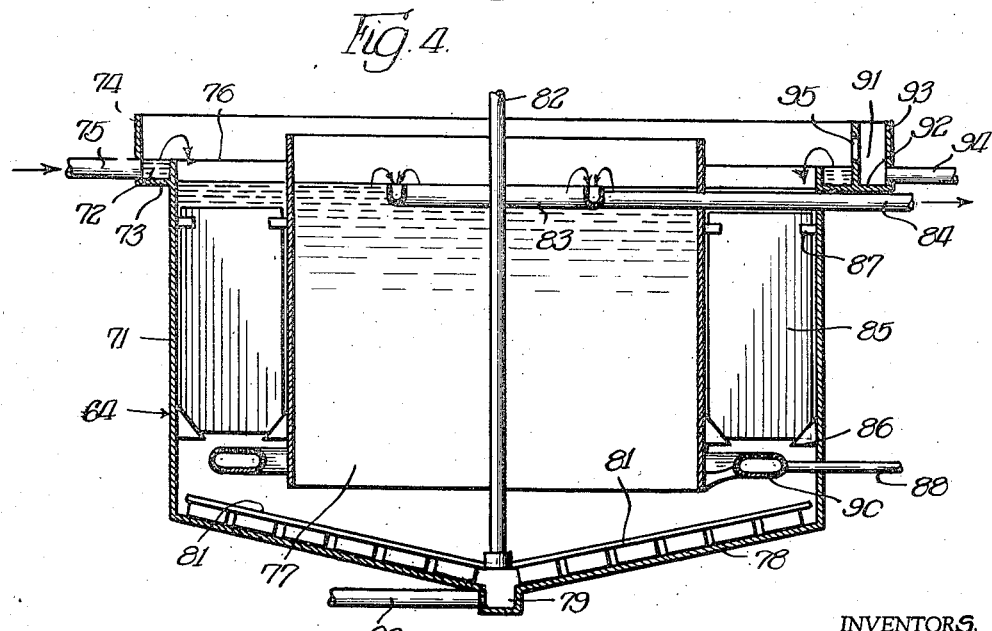
Figure 4 is a vertical sectional view through the combination tank taken substantially along line 4—4 of Figure 3.

Referring more particularly to the combination filter and clarifier, reference is made to Figures 3 and 4, wherein the tank is shown in detail. The outer peripheral wall 71 of the tank is provided with a launder 72 formed by the outwardly projecting horizontal base wall 73 and the vertical wall 74. The launder is supplied with solution by the inlet pipe 75 which passes through the vertical wall 74 of the launder. Overflow of the solution therefore takes place with respect to the weir 76 and as a result the solution is uniformly distributed within the aeration chamber of the tank formed by the peripheral wall 71 and the interior concentric baffle wall 77. In the particular design of tank disclosed the baffle wall 77 divides the tank into a central clarifying chamber and a peripheral aeration chamber, the last mentioned chamber occupying the space between wall 71 of the tank and the said baffle wall 77. The sloping bottom wall 78 of the tank is formed with a sump 79 having a sludge draw-off pipe 80. Rotating scraper arms 81 are located within the base of the tank, being suitably supported and rotated by the vertical shaft 82 which extends upwardly through the clarifying chamber. The clear effluent from the clarifying chamber is continuously withdrawn by the circular outlet member 83, channel-shaped in cross section, having connection with the outlet pipe 84 which extends through the baffle wall 77 and through the peripheral wall 71 of the tank.

The aeration chamber is provided with filter media in the form of plates 85 supported in an upright position within the peripheral chamber by the members 86. Similar members 87 at the upper end of the plates function as spacing elements and form slots for receiving said plates. A large number of plates are provided, extending completely around the aeration chamber and being disposed radially with respect to the center of the tank. In addition to the plates other surface providing material such as tile, crushed rock and the like may be used. Air is supplied to the chamber by the air supply pipe 88 which passes through the outer wall of the tank and connects with the perforated pipe 90. Said perforated pipe is suitably supported in position under the plates and the same extends completely around the aeration chamber so that all sections thereof are supplied with currents of air which issue from the pipe under pressure. These air currents pass upwardly between the plates 85 and promote the growth of biological organisms on the surface of the plates. The air currents pass upwardly toward the surface of the solution in the aeration chamber, whereas, the flow of the solution is in a downward direction. The downwardly flowing solution is thus aerated and also biological slime coatings are formed on the plates. These coatings further purify the solution by nitrifying the organic substances in the sewage, reducing them to simple salts, and the remaining solids are caused to coagulate into settleable solids which are eventually precipitated in the clarifying chamber. The two chambers provided within the combination tank are separated for the greater portion of their depth. However, the cylindrical baffle wall 77 terminates at a point below the air supply to the aeration chamber. This lower edge of the baffle wall thereby forms a circular weir and the space between the weir and the sloping bottom 78 of the tank provides a connecting passage between the aeration chamber and the clarifying chamber.

Within this latter chamber the solution flows in an upward direction. This materially facilitates the separation of the solids which are settled by gravity and deposited on the sloping bottom of the tank. It will be observed that the rotating sweeps 81 extend under the clarifying chamber and also under the aeration chamber. The rotary sweeps therefore have action with respect to the sludge and solids settling from both chambers. The material is moved at a relatively slow rate on the sloping bottom of the tank toward the sump 79 from which the sludge is withdrawn.

The manner in which the incoming solution is delivered to the aeration chamber by the launder 72 constitutes an important feature of the present invention. From the launder 72 the solution overflows the weir 76 and the same is thereby uniformly distributed throughout the entire peripheral extent of the chamber. The organic load therefore comes into contact with filter media having large surface area and which is well able to take care of its distributed portion of the load. Also the supply of air is adequate for each portion of the load and it will be observed that as regards the present tank it is impossible for the solution to by-pass or short circuit the aeration chamber.

The upwardly flowing air currents in the aeration chamber will cause the coagulated grease and other material of similar nature to float on the surface of the liquid within said chamber. This floating material may be continuously withdrawn or may be withdrawn at intervals by any convenient means. In Figures 3 and 4 a grease launder 91 is provided comprising the horizontal bottom wall 92 and the vertical wall 93 having the outlet pipe 94 extending therefrom. The launder 91 may extend completely around the tank on the outside of the wall 74 or the same may consist of individual sections, each section having a plurality of openings 95. In the normal operation of the combination tank the incoming solution will flow from launder 72 over the weir 76 into the aeration chamber. When it is desired to skim the grease or other floating material from the surface of the liquid in said chamber the flow of the clear effluent from outlet 84 is stopped and the level of the liquid in the tank is thereby raised until the liquid within the aeration chamber reaches the level of the outlets 95. From then on any further rise in the liquid level will cause the solution to flow through said outlets 95 into the grease launder 91. The initial flow taking place through openings 95 will comprise the coagulated grease and other floating material from the aeration chamber. After the flow has continued for a length of time to discharge most of this material the outlet 84 can be opened and the effluent allowed to flow from the clarifying chamber. The level of the liquid within the tank will therefore drop to a point below the weir 76 when the normal liquid level is reached which is substantially that occupied by the outlet ring 83.

In Figure 2 the combination aeration and settling tank is preceded by a primary clarifier, a trickling filter and an intermediate clarifier having direct connection with the combination tank. In Figure 5 a modified arrangement is shown wherein two combination tanks are coupled in series and preceded by a primary clarifier. The flow of the solution in the primary clarifier 18 is the same as previously described. The heavy sludge and solids are caused to settle out, the same being collected on the sloping bottom 21 and drawn off at the proper rate through the sludge discharge pipe 23. The solution overflowing the weir 22 is taken by the pipe 96 and delivered to the launder 72 of the combined aeration and settling tank comprising the first stage of the present equipment. From the launder 72 the solution overflows into the aeration chamber and is eventually delivered to the clarifying chamber as described with respect to Figures 3 and 4. The effluent from the outlet ring 83 is conducted by pipe 97 to the second stage combination aeration and settling tank. In this latter tank the solution is again subjected to aeration and to purification as a result of contact of the liquid with the biological organisms forming the activated slime coating on the plates 85. The final settling takes place within the clarifying chamber of this second stage tank and the clear effluent flows from outlet ring 83 into the outlet pipe 98 which, in this form of the invention, does not have connection with a recirculating pump.

The sludge draw-off for the tanks, namely, 23, for the primary clarifier, 100 for the first stage combination tank, and 101 for the second stage combination tank, are joined by pipe 102 connecting with the sludge pump 62 as previously described. The flow from this sludge pump may be delivered through pipe 59 back to the primary clarifier or to the digester by pipe 63.

In Figure 6 a constructional arrangement is disclosed by which additional filter media may be economically added to the aeration chamber of a combination tank such as shown in Figures 3 and 4. The additional plates 103 are suitably supported from the plates 85 and said additional plates are disposed diagonally with respect thereto. This diagonal positioning for the additional plates maintains the proper distance between adjacent plates although only alternate plates 85 are provided with such extensions. In other respects the construction and operation of the tank of Figure 6 is the same as previously described, the tank having an inlet pipe 75 for the incoming sewage discharging into a peripheral launder 72. The aeration chamber is of increased width and larger surface area is provided by the filter media as a result of the extensions to plate 85 provided by the diagonal plates 103. The cylindrical baffle wall 77 is generally of the same diameter as that shown in Figure 4 and the clear effluent from the settling chamber thus formed is drawn off from the tank of Figure 6 by the outlet ring 83 and outlet pipe 84.

Although in Figures 3 and 4 the aeration chamber is shown as extending around a centrally located clarifying chamber it is of course possible to reverse said chambers, in which case the aeration chamber would comprise the space within the baffle wall 77 and the clarifying chamber would comprise the peripheral space between said baffle wall and the wall 71 of the tank. The present combination tank has many desirable features which make possible certain constructional economies and also result in better purification of the sewage. As a result of the present design the coagulated grease and other floating material will collect on the surface of the liquid within the aeration chamber. All possibility of this grease passing through the plant has therefore been eliminated and any convenient method may be employed for periodically or continuously removing said grease from the chamber. Although the solution flows downwardly in the aeration chamber the air currents flow in an upward direction and said currents keep the light sludge in suspension in the solution until coagulation into heavier particles takes place, whereupon said heavier particles settle out by gravity. The scraper mechanism is common to both chambers, having a length whereby the arms extend across the entire tank bottom, and as a result of these and other improved features apparatus is provided wherein the solids in the solution are separated at a point of minimum velocity since the bottom of the baffle wall 77 forms a weir of maximum length with respect to which the solution flows from the aeration chamber to the clarifying chamber.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a method of treating sewage and the like wherein the raw liquid has been subjected to clarification and purification for removing the heavy matter and other settleable solids, the steps which consist in supplying the clarified and purified liquid to an aeration chamber and flowing the liquid downwardly in said chamber through a submerged filter bed and in opposition to upward currents of air for agitating the downwardly flowing liquid and for maintaining the submerged filter bed biologically active, then flowing the liquid in an upward direction within a contiguous settling chamber providing a quiescent zone of upward liquid flow in advance of the outlet for the clear effluent, and withdrawing the clear effluent from said outlet.

2. In a method of treating sewage and the like wherein the raw liquid has been subjected to clarification and purification for removing the heavy matter and other settleable solids, the steps which consist in supplying the clarified and purified liquid to an aeration chamber and flowing the liquid downwardly in said chamber through a submerged filter bed and in opposition to upward currents of air for agitating the downwardly flowing liquid and for maintaining the submerged filter bed biologically active, then flowing the liquid in an upward direction within a contiguous settling chamber providing a quiescent zone of upward liquid flow in advance of the outlet for the clear effluent, withdrawing the clear effluent from said outlet, and simultaneously collecting the deposited sludge from the bottom of both said chambers and withdrawing the same through a common discharge.

3. A method of treating sewage and the like which comprises the steps of supplying the incoming liquid to a trickling filter, conducting the discharge from the trickling filter to a clarifier having a settling chamber for holding a body of the liquid under conditions favorable for the deposition of the settleable solids and also having an overflow for the clarified liquid, and subjecting the clarified liquid to further purification by flowing the liquid in a downward direction through a submerged filter bed within an aeration chamber and in opposition to upward currents of air for agitating the downwardly flowing liquid and for maintaining the submerged filter bed biologically active, and then flowing the liquid upwardly through a settling chamber for holding a body of the liquid quiescent and providing a zone of upward flow to thereby promote the deposition of the settleable solids before the clear effluent is withdrawn from the settling chamber.

4. A method of treating sewage and the like which comprises the steps of supplying the settled liquid to a trickling filter having a biologically active filter bed, conducting the discharge from said filter to a clarifier having a settling chamber for depositing the settleable solids and having an overflow for the clarified liquid, and subjecting the clarified liquid to further purification by flowing the liquid in a downward direction and in a uniformly distributed manner through a submerged filter bed within an aeration chamber and in opposition to upward currents of air for agitating the downwardly flowing liquid and for maintaining the submerged filter bed biologically active, and then flowing the liquid in an upward direction within a contiguous settling chamber to an overflow for the clear effluent.

5. A method of treating sewage and the like which comprises the steps of supplying the settled liquid to a trickling filter having a biologically active filter bed, conducting the discharge from said filter to a clarifier having a settling chamber for depositing the settleable solids and having an overflow for the clarified liquid, and subjecting the clarified liquid to further purification by flowing the liquid in a downward direction and in a uniformly distributed manner through a submerged filter bed within a peripheral aeration chamber and in opposition to upward currents of air for agitating the downwardly flowing liquid and for maintaining the submerged filter bed biologically active, discharging the liquid from the aeration chamber to within the bottom portion of an upflow settling chamber centrally positioned and connecting with the aeration chamber, said settling chamber maintaining a quiescent zone of upward liquid flow to promote the deposition of the settleable solids, withdrawing the clear effluent from the upper portion of the settling chamber, and withdrawing the deposited solids from both said chambers through a common sludge outlet.

JOHN A. MONTGOMERY.
LOUIS E. LIVINGSTON.